(12) United States Patent
Giles et al.

(10) Patent No.: US 6,724,889 B1
(45) Date of Patent: Apr. 20, 2004

(54) METHOD AND SYSTEM FOR LINE STATUS INDICATORS USING LINE SIDE POWER

(75) Inventors: Rick D. Giles, Sandy, UT (US); Tim Urry Price, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/431,416

(22) Filed: Nov. 1, 1999

(51) Int. Cl.[7] ............................................. H04M 1/00
(52) U.S. Cl. .................. 379/377; 379/412; 379/399.01; 379/413
(58) Field of Search ............................. 379/399.01, 400, 379/401, 402, 403, 413.01, 413, 413.02, 413.04, 377, 380, 381, 390.04, 412, 322, 323, 324

(56) References Cited

U.S. PATENT DOCUMENTS

| | | | |
|---|---|---|---|
| 4,417,099 A | * 11/1983 | Pierce | 379/413 |
| 4,564,728 A | 1/1986 | Romano | 179/175.3 |
| 4,620,070 A | 10/1986 | Ruehl | 179/175.3 |
| D291,071 S | 7/1987 | Breil | D10/78 |
| 5,183,404 A | 2/1993 | Aldous et al. | 439/55 |
| 5,336,099 A | 8/1994 | Aldous et al. | 439/131 |
| 5,338,210 A | 8/1994 | Beckham et al. | 439/131 |
| 5,513,373 A | 4/1996 | Damkier | 395/836 |
| 5,547,401 A | 8/1996 | Aldous et al. | 439/676 |
| 5,646,816 A | 7/1997 | Alden et al. | 361/622 |
| 5,692,914 A | 12/1997 | Mitani et al. | |
| 5,727,972 A | 3/1998 | Aldous et al. | 439/655 |
| 5,741,152 A | 4/1998 | Boutros | 439/490 |
| 5,767,623 A | 6/1998 | Friedman et al. | 313/509 |
| 5,790,041 A | 8/1998 | Lee | 340/815.45 |
| 5,797,771 A | 8/1998 | Garside | 439/610 |
| 5,802,151 A | * 9/1998 | Bevill, Jr. et al. | 379/93.05 |
| 5,816,832 A | 10/1998 | Aldous et al. | 439/131 |
| 5,876,239 A | 3/1999 | Morin et al. | 439/490 |
| 5,885,100 A | 3/1999 | Talend et al. | 439/490 |
| 5,991,335 A | * 11/1999 | Price | 375/219 |

* cited by examiner

Primary Examiner—Rexford Barnie

(57) ABSTRACT

A power management circuit for use in a terminal interface device such as a modem which converts available line side power into usable power for use by the terminal interface device to activate a variety of line status indicators. These line status indicators signaling the off-hook status of the terminal interface device, low line side power, or the presence of excessive line current. The line status indicators draw power from the available line side power without placing a burden on the attached digital device or its power source. Certain line status indicators utilize flasher/oscillator circuits to increase the functionality of the line status indicators by providing a frequency based pulse to more accurately describe the operating environment of the circuit. The power management circuit is additionally comprised of a voltage regulator which, when a terminal interface device becomes operational, is enabled and regulates available voltage and current into usable power as available from the interfacing communication network. The preferred embodiment of the power management circuit is further comprised of a programmable hold current sink which enables a terminal interface device incorporating the power management circuit to be compatible with multiple communication networks having diverse hold current specifications.

20 Claims, 6 Drawing Sheets

METHOD AND SYSTEM FOR LINE STATUS INDICATORS USING LINE SIDE POWER

BACKGROUND OF THE INVENTION

1. The Field of the Invention

The present invention relates to the field of communication networks and systems. Particularly, this invention relates to interfacing with telecommunication networks requiring a specific interface characteristic for compatible interaction with the network. More specifically, the invention relates to maintaining the interface characteristics and requirements for the dissipation of line side power by a telecommunications terminal interface device, where the line side power is used to provide operational power to line status indicators.

2. Prior State of the Art

Modern data transmission devices such as computers are increasingly used in applications that require exchange of data over a communication network. Some of the more popular communication networks used to propagate data are the well established telephone networks. Such networks were originally designed to accommodate, and therefore propagate, the transmission of voice conversations which include very specific bands of frequencies. Individual countries have implemented unique power and frequency standards relating to their particular implementation of telephone networks.

While the inter-operation specifications differ for national telephone networks, they each require the modulation of computer data in order to comply with the individual specific bandwidth requirements. To facilitate the modulation and the complementary demodulation processes, devices known as modems (MOdulate/DEModulate) have become ubiquitous. In order to compatibly inter-operate with the telephone network, a modem must perform certain "telephone handset" functions to appear to the telephone network as though it were a legacy telephone handset-compatible device.

Since legacy telephone handsets typically employed electronic circuitry requiring higher power levels, the legacy telephone networks continue to require modem communication devices interfacing therewith, such as modems, to appear to the telephone network as though it were a legacy handset by adhering to specific or specified power ranges which include drawing from the telephone network a specific voltage range as well as a specified range of current from the telephone network.

An example of a legacy telephone handset function is when the modem is "off-hook." Off-hook functionality requires the modem to signal the telephone network that information is either going to be sent by the modem to the telephone network or that the modem is ready to receive information from the telephone network. Telephone network specifications typically require that the modem or other terminal device signal an off-hook condition by drawing or sinking a specified amount of current from the telephone network. Traditionally, such drawn current was utilized by a telephone to "power" the telephone during use.

Often existing communication networks are commonly used by modem networks, for example the POTS or other internationally similar networks are used to expand connectivity to the network. A POTS network provides an archaic interface that requires a specific amount of off-hook current to be drawn. The typical domestic line side current available is generally in the range of 10 mA to 40 mA, with the preferred range being around 15 mA. Some international telecommunication standards require that a modem's hold circuit must be able to sink around 120 mA of line current.

In a modem application, where a digital device such as a computer requires appreciable power, the current drawn by the modem is a fraction of the power used by overall digital device. As such, attempts to use the line side power provided by the off-hook condition are typically unnecessary and therefore wasted as the modem functionality derived power either from an external independent power supply or by sharing the power supply of the computer or host device. Furthermore, there is considerable fluctuation of the available line side power, making it difficult to regulate the use of line side power with the delicate modem circuitry.

Another problem facing designers of telecommunication interface devices are the variety of telecommunication specifications propagating worldwide. Those familiar with global telecommunications standards appreciate that various countries have implemented individual and oft times incompatible telephone network standards thereby precluding handsets from inter-operating in various national inter-networks. In the present global climate various countries have settled upon common standards for enabling compatibility between national telephone networks. Once such standard that has been adopted in the majority of European community countries is the TBR21 standard which propagates a specification of standards to which inter-operating terminal equipment, such as telephone handsets and modems, must comply in order to compatibly inter-operate on the European community telephone network.

One such requirement propagated in the specification is a power curve specifying a voltage and current range within which the terminal equipment must inter-operate. Those familiar with the electronic arts appreciate that the voltage and current requirements as propagated in the TBR21 specification are substantial in view of modern, low power electronic circuitry. While electronic devices and circuitry can be implemented in accordance with the higher power specifications of the modem standard, electronic components subjected to higher power levels exhibit earlier power failures and therefore decreased reliability due to the enhanced power. It should be pointed out that while electronic components capable of absorbing higher power levels while maintaining high reliability are available, in mass manufacturing global environments, such high reliability, high power components tend to be impractical due to their high cost and larger physical dimensions, especially in view of an ever increasing miniaturization of electronics.

In the advent of miniaturization, computers have become increasingly more integrated and as such have become more mobile and portable. One overriding design concern with portable computers is power management. In a portable environment, all of the operating power for the computer and any peripheral devices, such as modems, must be resident within the computer. Hence, portable computer batteries are heavily taxed by all of the attached peripheral devices. Therefore, the inefficient use of available line side power affects the overall performance of the digital system by increasing the overall power usage and decreasing the battery life, resulting in a overall higher power dissipation in the hold circuit. Specifically, power is used from the computer battery to indicate the line status of the modem and power is dissipated to comply with the specifications of the telecommunication network.

As previously mentioned, the power drawn had heretofore been unusable by terminal interface devices, such as modems, since older terminal interface devices required an amount of power for operation beyond what was available. With miniaturization and development of lower power designs, the available power from, for example, the POTS is sufficient to be employed for useful power to electronic components on a network interface device. However, the fluctuation of available line side power is still problematic. The network interface device cannot depend on a variable power source, furthermore, the modem may not introduce noise onto the line side of the communication network which prevents attempts to regulate line side power.

Yet another problem in the realm of data transmission devices is the varying telecommunication interface specifications. The similarity of the network jacks or interface devices connecting the computer to the communication network is the source of considerable confusion. Attempts to connect an analog modem to the phone jack of a digital system result in excessive line current that can fuse the low power circuitry of the modem. To prevent this type of hardware meltdown, some communication programs will display a generic error message, alas the programs do not provide a description of what causes the error. Leaving the user to speculate what the generic error message was indicating. Often the generic error message will only be displayed when the user runs the proprietary communication software to initiate the modem connection. If third party software makes the communication request to use the modem, the error message may not even be displayed to the user. In many cases the damage is done before the user is even aware of the digital line. What is needed is a system that will indicate the presence of excessive line current at the point of connection, so action may be taken before the user's modem is damaged. Additionally, a device that indicated the presence of excessive line current and automatically protected the interface would be an improvement over the prior art.

As previously indicated, most communication applications direct the digital device to send a message to the user via monitor screen or an audio transducer and then place the modem back on hook to prevent damage to the interface device once excessive line current is detected. As this is a generic error message no true indication is given to the user that an incorrect line is connected. Even once the warning indication is detected, many communication programs will generate a message indicating an error, with no description of what the error provided, thereby leaving the user to speculate on the meaning of the error message. Thus, what is needed is a device that will provide the user with an indication of an incorrect line interface. Specifically, digital lines may damage and even destroy analog modem connections. Such an indicator located on the modem would allow the user to recognize the improper digital connection and avoid destruction of the modem or the attachment circuit.

Thus, what is needed is an apparatus for efficiently utilizing available power in a telecommunication system to more efficiently manage scarce on-board battery power from a portable device such as a portable computer by utilizing available line side power from the telecommunication network during interaction therewith.

What is also needed is an inexpensive system for compatibly interfacing with the high power specifications of legacy telephone networks without reducing the overall reliability of the system, specifically indicating to the user, at the point of interface, if there is excessive line current present in the connection without using battery power for the indicator. This system should economically absorb the requisite power from the legacy telephone equipment as required by the telephone network specification and dynamically adjust the voltage and current drawn from the interface of a terminal as presented over a telephone network.

SUMMARY AND OBJECTS OF THE INVENTION

It is therefore an object of the present invention to provide an efficient power management circuit for incorporation into a terminal or network interface device, (e.g., a modem), that utilizes available line current from a communication network, (e.g., a telephone network), in order to adequately power line status indicators on the network interface device with minimal power impact on the digital device (e.g., a computer and attached computer battery).

It is yet a further object of the present invention to provide a system for efficiently managing the voltage and current specifications imposed on terminal equipment in a telephone network.

It is therefore a further object of the present invention to provide a power circuit for incorporating into a network interface device, such as a modem, that is compatible in various international environments that employ varying communication network specifications including differing line or hold current levels to signal an off-hook condition.

It is yet a further object of the present invention to provide a system for efficiently managing the power-sinking requirement that terminal equipment must present to a telephone network.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a power circuit apparatus for improving upon the architecture and power management of a terminal equipment device, such as a modem, is presented. The power circuit apparatus is deployed in portable environments wherein power management is critical. The power circuit apparatus includes a circuit capable of absorbing or sinking excess power that must be absorbed by the terminal equipment, such as a modem, in order to fall within the compliance specifications propagated by the host telephone network.

As previously mentioned, modem standards require network interface devices to function in compliance with the legacy handset device specifications. This creates the inefficient requirement for the network interface device to sink or dissipate power from the line side power, while using valuable battery power to indicate the line type and off-hook status. By using the hold or line side current from the line or communication network side to power the indicator circuitry, the inefficiencies associated with dual circuitry for power dissipation and line status indicators are minimized.

The circuit of the present invention, in its preferred embodiment, is comprised of an indicator module powered from available line side current derived from the communications network and regulated by the terminal interface device's hold circuitry. When the hold circuitry either detects a "ring" signal as dispatched from the communication network or when the digital device signals the network interface device (e.g., modem) to open a channel with the communications network for originating a session, the network interface device goes "off-hook." As recalled from above, the off-hook condition signals to the communication network by drawing or sinking a requisite amount of line current, commonly called hold current or line current, from the communication network.

The voltage across the communication network terminals (e.g., tip and ring in the POTS environment) is used to power a status indicator in the network interface device. Any excess current from the voltage regulator is absorbed by the shunt regulator. Typically, the indicator is a light emitting diode (LED), but auditory and tactile indicators may also be used. Most LEDs will burn out if more than 20 mA are passed through them. As some communication network standards require circuits to sink at least 120 mA of line current the voltage regulator protects indicator circuitry from damage. As previously, mentioned the presence of excessive line current can damage the terminal interface device. Excessive line current may also be an indication that the line is really a digital phone line. Due to the dangers of excessive line side power, the present invention provides an indicator to sense excessive line current and digital lines.

Whenever a low line side current condition occurs the indicator may alter its display, for example the LED will suffer in brightness with reduced line side power. Generally, low line side power is not too great of a problem, since most line current levels are at least 15 mA or greater, however, there are some areas that may drop as low as 10 mA. In this situation a pulse module can store line side power until a periodic burst of power within the indicator operating range can be generated. If the indicator is an LED, the burst will cause the indicator to flash or blink, but the LED's brightness will not be noticeably reduced. In fact, the pulse itself becomes an indicator of the presence of low line side current.

The present invention also accommodates the multinational nature and use of modem network interface devices by incorporating a programmable "hold" current sub-circuit that may be programmably altered to conform with varying national standards relating to the requisite hold current that must be drawn from the communication network to signal an off-hook condition.

These and other objects and features of the present invention will be more fully apparent from the following description and appended claims, or may be learned by the practice of the invention as set forth herein.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is drawn to a power shunt circuit and an indicator circuit which may be employed or incorporated into a terminal equipment device, such as a modem, for interfacing with a telephone network. As describe above, telephone networks impose specific stringent standards upon terminal equipment that interface with the telephone network. In the preferred embodiment of the invention, an indicator and shunt circuit complying with a telephone network specification standard that imposes specific power absorption requirements upon terminal equipment desiring to interface with the telephone network is used to create an efficient line side circuit for indicating line status and shunting excess power. For example, one international standard requires that up to 120 mA of line current must be able to be sunk by a modem's hold circuit. Many indicator means would burn out if more than 20 mA are passed through them. The present invention provides several methods by which the indicator means may be activated by line side current and still provide the proper current sinking to maintain or comply with an off-hook condition. In addition to off-hook status, the indicator circuitry can also provide a method to warn a user whenever excessive line current is present, as occurs when one connects to a digital line. By using the line side power to control the indicator means, the line status can be conveyed to the user without using battery power from the host digital device.

For purposes of this invention, indicator means include all sensory based indicators. For example, visual, tactile, or audio indicators or any combination of these should be considered within the scope of the present invention. Visual indicators include LEDs, liquid crystal displays, or monitoring devices. Each of these visual indicators can be varied using colors, brightness, or synchronized pulses to represent various line status conditions, for example a pulsing light could represent low line side power and a red indicator could indicate the presence of excessive line side power. Audio indicators may generate a full spectrum of audible noises, including chiping, beeping, continuous tone, or a specific audible message. Tactile indicators include vibration, texture alteration, electric tingle, generation of specific Braille characters, or the creation of a temperature variation. The preferred embodiment of the present invention calls for the use of visual colored LED indicators.

Figure 7:
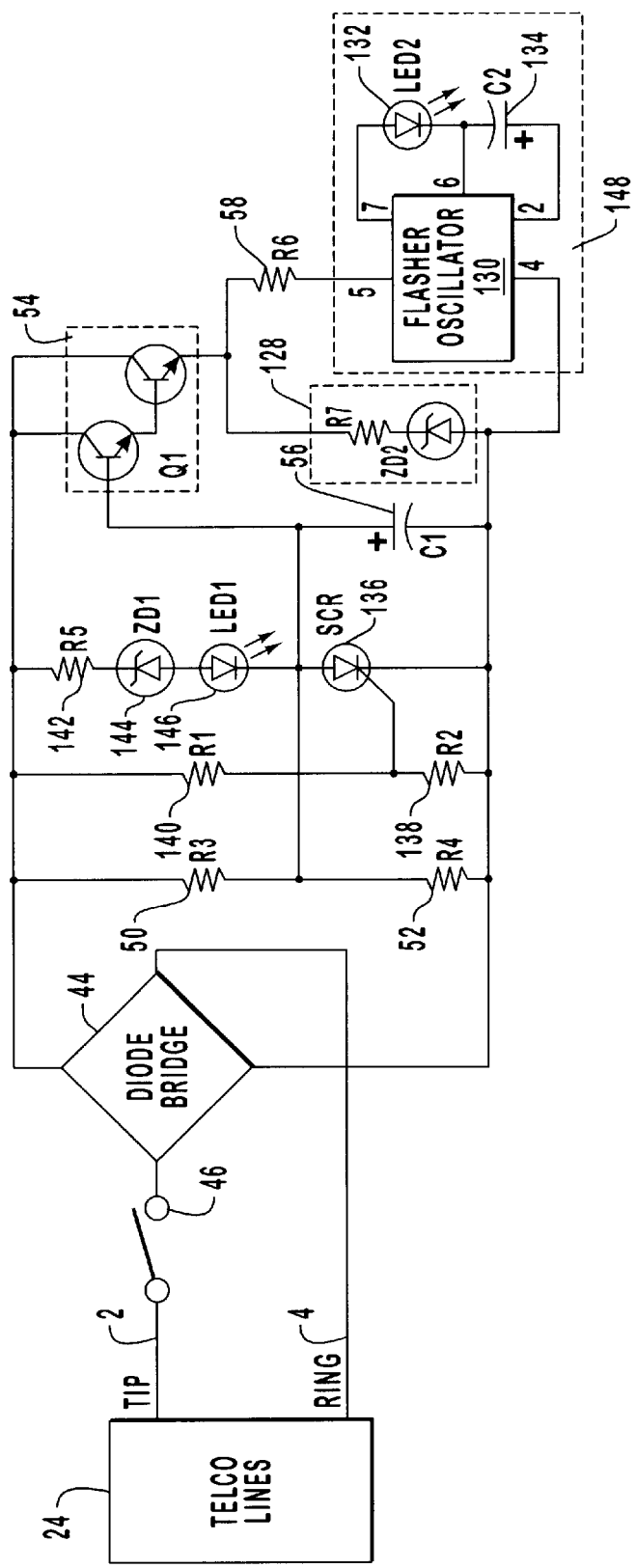
FIG. 7 is a circuit diagram illustrating an excessive line current indicator and a blinking off-hook indicator.
Figure 8:
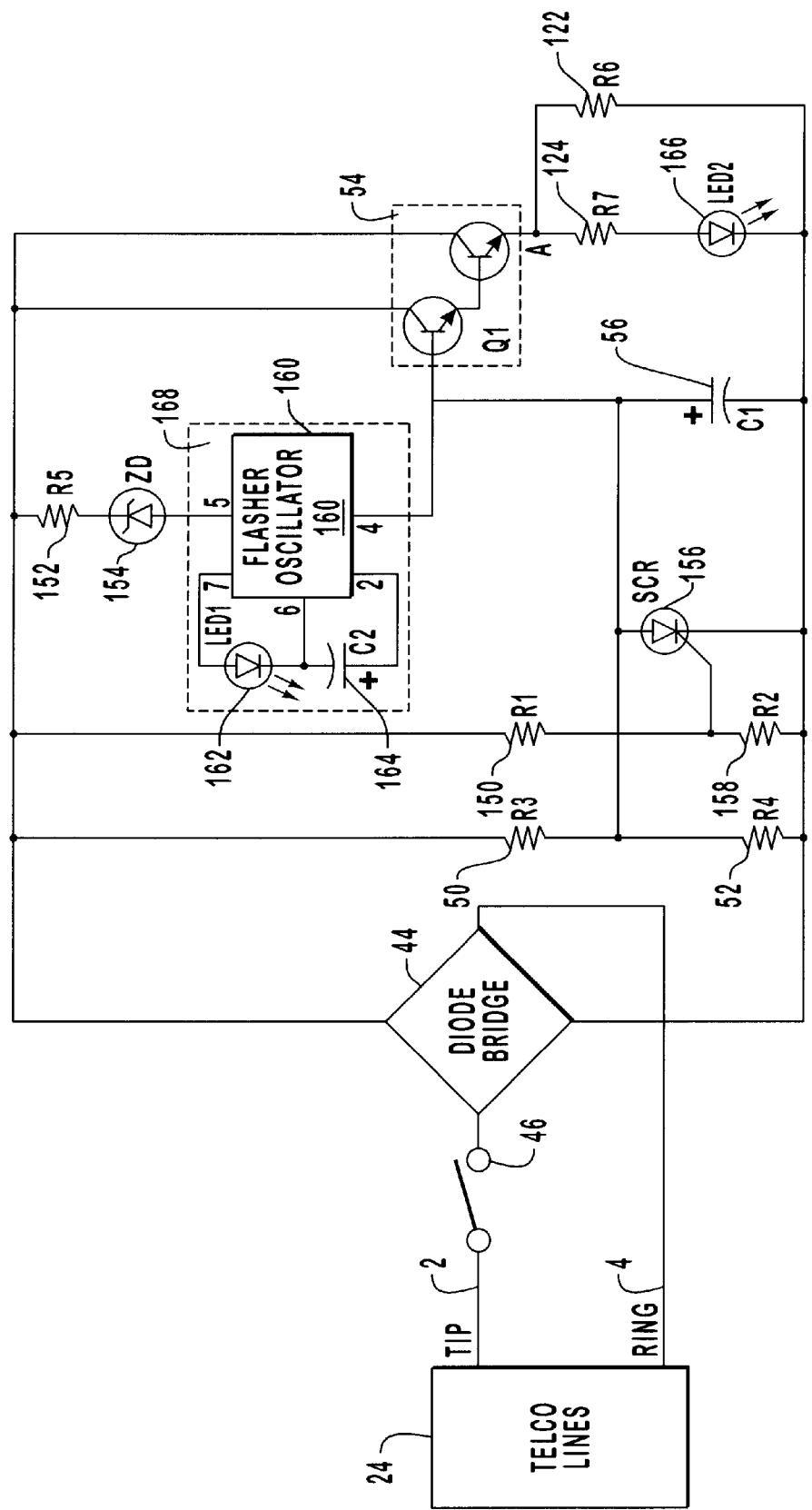
FIG. 8 is a circuit diagram illustrating a blinking excessive line current indicator and steady state off-hook indicator.

One method of providing an indicator is through a light emitting diode (LED). There are several colors of LEDs available, making them useful in creating a one look indicator module. Each color can represent a different quality of the line status. For example a green LED could represent the off-hook status and a Red LED could warn against excessive line current. Unfortunately, one hazard with illuminating the LED using the line side current is that whenever a low line side current condition occurs, the LED will suffer in brightness. However, if the circuit is properly adjusted this drop should not cause a tremendous diminution in illumination since most line current levels are at 15 mA or greater. This means that a circuit established to support the LED at 15 mA will only suffer minimal reduction in brightness due to circuit optimization. A designer may choose not to modify the circuit for current between 10 mA and 15 mA, however a pulsing module as depicted in FIGS. 7 and 8 could be included in the circuit to maintain the brightness and indicate a low line side current value.

Figure 1:
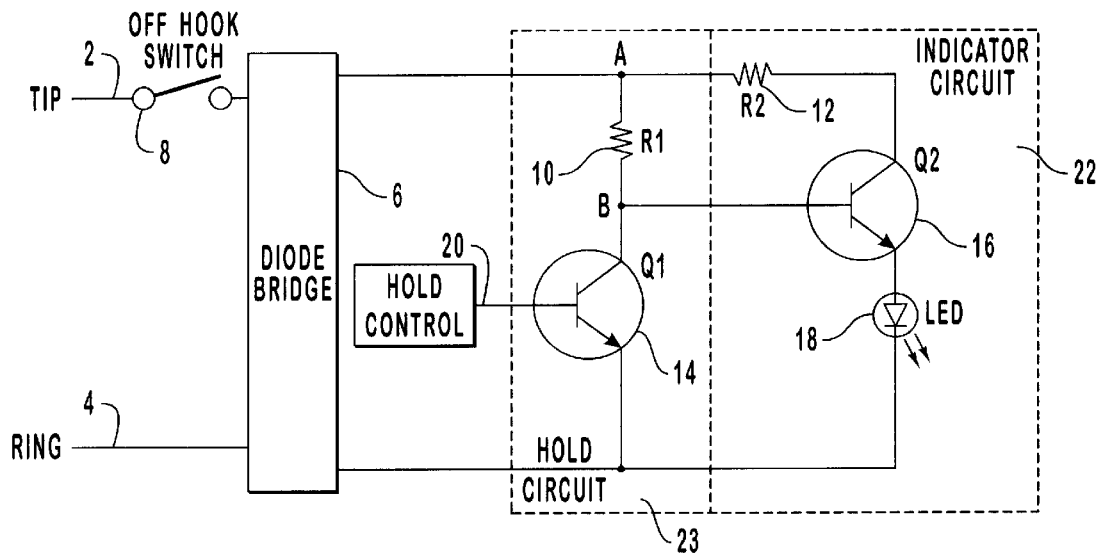
FIG. 1 is a block diagram depicting a LED indicator circuit using "Tip" and "Ring" current to indicate an off-hook condition.

FIG. 1 represents a generic circuit version of one embodiment containing the relevant elements for a single indicator portion of the present invention using line-side power. The indicator circuit 22 works in conjunction with the off-hook switch to light the LED 18 when a hold circuit module is sinking line side power. Generally, there is 10 to 15 mA minimum current sunk from the tip and ring connection in a off-hook condition. This current is normally wasted in a hold circuit of a terminal interface device (e.g., a modem), where the terminal interface device dissipates the power. One challenge with power dissipation performed in this fashion is the generation of a substantial amount of heat. The circuit depicted in FIG. 1, allows a hold control module 20, through the control of a transister Q1 14, to effectively split power between the indicator circuit 22 and a hold circuit 23, thereby reducing the heat generated by each circuit. Although there is not a dramatic overall heat reduction, the circuit does spread out the heat between two circuits. Referring to FIG. 1, the tip 2 and ring 4 lines enter a diode bridge 6 and are properly rectified. An off-hook switch 8 connects the diode bridge 6 to a common potential node A which is connected to resistors R1 10 and R2 12. Off-hook switch 8 may be placed on either side of diode bridge 6. Resistor R1 10, the collector of a transistor Q1 14, and the base of another Transistor Q2 16 are connected to a common potential node B. Resistor R2 12 attaches to Q2 16 via the collector of Q2 16. The emitter of Q2 16 is attached to the current limited LED 18. The base of Q1 14 is electrically attached to a hold control module 20 such that the hold control module may direct the flow of excess power. The emitter of Q1 14 is connected to the diode bridge 6 and is properly rectified to the ring line 4. The LED 18 is also attached to the ring line 4. In some embodiments the rectified ring line 4 is grounded by the terminal interface device, depending on the applicable connection standard or specification.

This embodiment uses line side current to light up the LED 18 when the off-hook switch 8 is closed. Resistors R1 10 and R2 12 are selected and adjusted to turn on the Transistor Q2 16 and only allow the proper amount of current to flow through to the LED 18. By controlling the base of Transistor Q1 14, the hold control module 20 activates the hold circuit and indirectly allows the indicator circuit to turn on or off. In this way the hold control module 20 regulates current to the indicator circuit 22. The LED 18 may even provide destructive current limiting if the Q2 16 emitter current ever exceeds the LED 18 specifications. For higher voltage/current/power phone lines, the indicator circuit 22 may be shunted by the normal hold circuit 23, Q1 14 and associated components. A simple transistor switch may be used to connect the LED 18 directly into the hold circuit. Or the LED 18 may be shunted by an external hold circuit to only allow the 20 mA maximum current in the indicator circuit 22.

A similar implementation utilizing the line side power to provide line status indicators can be constructed by placing LEDs within the rectifying bridge or diode bridge to allow the communication line to be rectified and to provide the lighting status function. The modified LED diode bridge would be attached to the standard hold circuitry of the terminal interface device and controlled by the off-hook switch.

Figure 2:
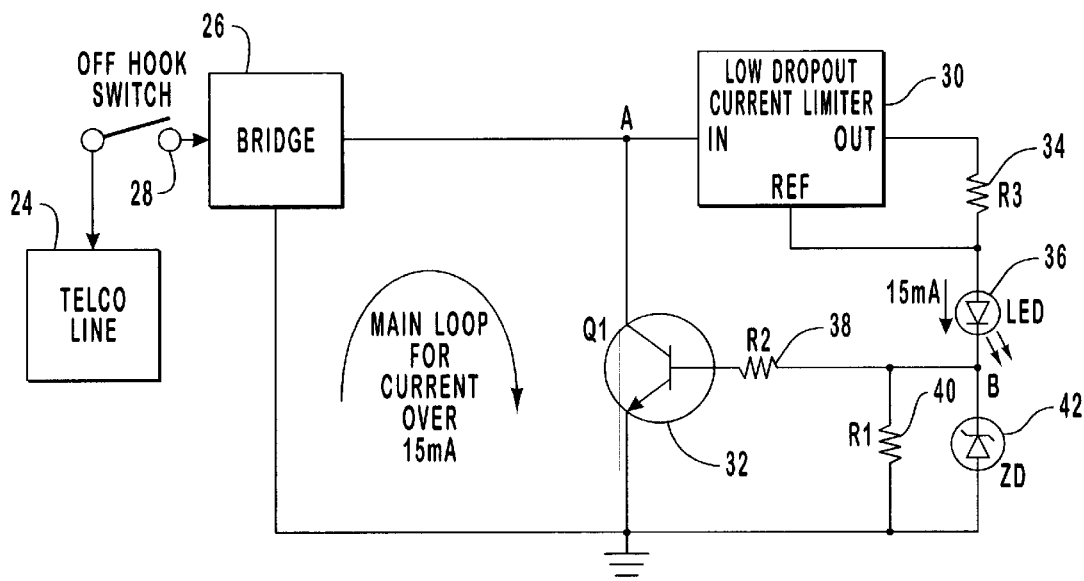
FIG. 2 is a circuit diagram of a simplified line side LED current regulator, in accordance with the preferred embodiment of the present invention.

FIG. 2 illustrates a line side LED current regulator. The circuit provides for a transistor to sink any current above the functional limits of the LED indicator through a secondary current path circuit. The secondary current path, effectively comprising a current shunt, activates whenever the line current is above a predetermined level. As previously indicated, an operational range between 10 and 20 mA is preferred. More specifically the more preferred current is around 15 mA. Line side current up to this level is passed by a voltage regulator in current regulator mode through to the LED. The secondary current sink circuit will handle all current above this set threshold. The current regulator is used to limit the current to the LED to the preferred levels. The LED circuit will receive all of the line current, up to the preferred amount, before the secondary circuit begins to sink any. One of the benefits to this idea is that the total line current is shared between two circuits. Therefore, each circuit will dissipate less power. For example, if the off-hook specification calls for the circuit to drop 20 mA, 15 mA will be dissipated by the LED and 5 mA would be dissipated by the hold circuit and current shunt.

Referring to FIG. 2, the communication network provides the telephone line 24 allowing the terminal interface device to attach to the network using bridge 26. In a POTS system the telephone line 24 would include the tip and ring lines previously discussed. The bridge 26 includes a diode rectifier and other necessary communication circuitry for the terminal interface device. The relevant line side power lines are electrically connected to the off-hook switch 28 which effectively controls the connection by turning it on or off. The off-hook switch 28, a voltage regulator in current regulation mode 30, and a transistor Q1 32 are connected to a common potential node A. The voltage regulator is configured to act as a low dropout current limiter and set at a preconfigured level relative to the LED. The example uses a low dropout LM2950-5 current regulator configured for 15 mA. Although the LM2950-5 voltage regulator is illustrated in this example, numerous other topologies for current control are known to those skilled in the art and can be used without departing from the scope of the invention, for example, current mirrors, band gap references, etc. Each method of current control has its respective advantages and disadvantages and are customized as understood by experts in the field. The current regulator acts in relation to the common potential node A as a high alternating current (AC) impedance, low linear direct current (DC) impedance. The current regulator must also limit the LED current to the specified or designed amount. The LM2950-5 is used in FIG. 2 strictly to provide a very simple conceptual example. Those skilled in the art recognize that FIG. 2 is not complete or optimized as drawn.

When the off-hook switch 28 is closed, the current regulator 30 sinks up to the preferred limit. Resistor R3 34 allows the current regulator 30 to reference the current flow through the LED 36. The current passes through the LED 36 to common potential node B, which is electrically attached to resistors R2 38 and R 40 and a zener diode ZD 42. Resistor R2 38 is electrically attached to the base of the bipolar junction transistor Q1 32. The bridge 26, the emitter on Q1 32, R1 40, and the zener diode ZD 42 are all at a common potential or grounded. The bipolar junction transistor Q1 32 is held off until the voltage across R1 40 reaches a specified voltage at common potential node B. This voltage occurs at the preferred current limit, for example a 15 mA current will generate around 0.6 to 0.7 volts at node B. This voltage then turns on Q1 32 and the transistor starts to sink any current above the preferred amount by splitting the current at common potential node A. If Q1 32 sinks more current and reduces the current flow to LED 36, the drop in current through the LED 36 begins to turn off Q1 32. The net effect is that the LED 36 never receives more than the preferred amount and Q1 32 sinks any current above the preferred amount. If the line side current stays below the preset preferred level, 15 mA in the example, the shunt circuit is never activated and the LED receives all available current. The zener diode ZD 42 provides the LED circuit with a safety valve in high voltage, high current situations. One advantage to this circuit lies in the fact that power dissipation is shared between the shunt circuit and the LED circuit thereby reducing the heat generated by the components in both circuits. Specific values for the components in one embodiment are provided in Table 1 below:

TABLE 1

FIG. 2 Components

| Reference Number | Component Designation | Value |
|---|---|---|
| 30 | Low Dropout Current Limiter | LM2950-5 |
| 40 | R1 | 46Ω |
| 38 | R2 | 200Ω |
| 34 | R3 | 330Ω |
| 42 | ZD | 2.4 V |

The nature of this circuit is such that it can be optimized for specific applications or operating environments by varying these component values, according to component selection principles understood by those skilled in the art. Thus the embodiment provided in Table 1 should not be construed as being indicative of the entire scope of the invention, but merely as one embodiment optimized for one operating environment.

Figure 3:
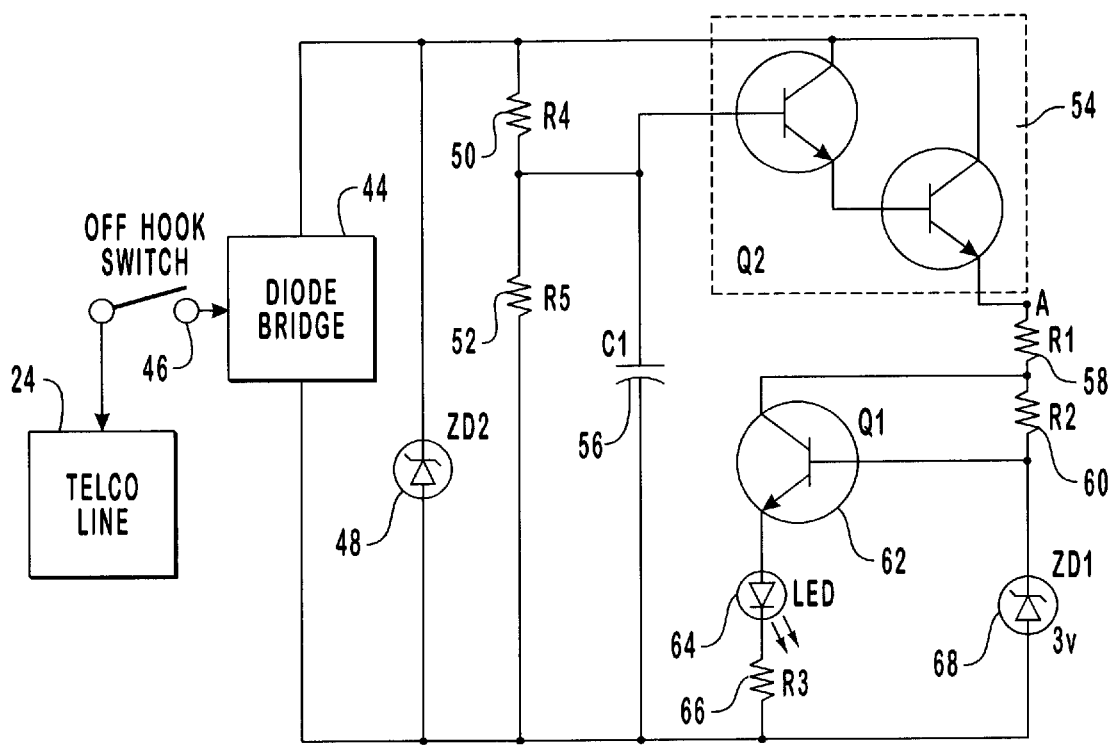
FIG. 3 is a circuit diagram of a single hold circuit with LED current limit.

The use of an LED in the primary hold circuit with a current limiting shunt is illustrated in FIG. 3. The circuit shown in FIG. 3 is a modification of a standard modem "hold" circuit. The standard hold circuit comprises the telephone line 24, generally containing the tip line 2 and the ring line 4; the off-hook relay/switch 46; the diode bridge 44; resistors R4 50, R5 52, and R1 58; capacitor C1 56; and transistor Q2 54. The transistor Q2 54 in FIG. 3 is preferably configured in a Darlington configuration. The Darlington configuration allows two bipolar junction transistors electrically arranged in a common collector arrangement to perform as the equivalent of a single transistor whose common-emitter current gain is $\beta=\beta_1\beta_2$ where $\beta_1$ is the first transistor's common-emitter current gain and $\beta_2$ is the second transistor's common-emitter current gain. In this configuration, transistor Q2 54 can be used as a high performance follower. This circuit allows the terminal device to "hold" the telephone line when the off-hook relay/switch 46 is closed by sinking the requisite line side current. For example, approximately 15–20 mA of line side current can be sunk within the hold circuit, if it is constructed with the following approximate component values: resistor R4 50 being 40.2 kΩ, resistor R5 52 being 18.7 kΩ, resistor R1 58 being 10Ω, and capacitor C1 56 being 3.3 μF.

The primary difference between the standard hold circuit and the circuit illustrated in FIG. 3 is in the "emitter resistor" of the bipolar junction transistor Q2 54. Normally, only a single resistor, R1 58, is connected to the emitter junction of the bipolar transistor circuit Q2 54, but the resistor, R1 58, has been adjusted and indicator circuitry has been added comprising: resistors R2 60 and R3 66, zener diode ZD1 68, transistor Q1 62, and an LED 64. The indicator circuitry regulates the current to the LED 64. Up to the common potential node A, the hold circuit functions normally. DC current is passed through transistor Q2 54 towards the LED 64. Initially after the modem is taken off hook, no current is flowing through R1 58 or R2 60. This pulls the base of Q1 62 high and turns Q1 62 on. As the transistor is turned on, current begins to flow through Q1 62 to the LED 64 and R3 66. As the voltage on the base of Q1 62 increases, it will eventually raise to the preset voltage limit of the zener diode ZD1 68. Once ZD1 68 is turned on, it will maintain the base of Q1 62 at the specified value (e.g., 3 volts). This keeps Q1 62 active and turned on. R3 66 and R1 58 limit the current to the LED 64. Any current over the level defined by these resistors (e.g., 15 mA) will pass through ZD1 68. R2 60 and R1 58 limit the current through ZD1 68, but will be rated to pass through the maximum current minus the LED 64 current. For example, ZD1 68 should be rated at approximately 1 watt to handle the 15 mA current passed through the LED 64.

An advantage to the circuit illustrated in FIG. 3 is its proven linearity. The inductive load comprising transistor Q2 54 and capacitor C1 56 looks inductive to the telephone line 24. The circuit also has a high AC resistance and a low DC resistance. The result is that current passing from transistor Q2 54 to the LED 64 is straight DC. The hold and indicator circuits in effect demonstrate the use of an LED 64 in the modem's "hold circuit." This enables the line side current to illuminate or to activate the indicator LED 64. These circuits also provide the use of a secondary current shunt circuit in parallel with the LED hold circuit, to sink any additional current in excess of a preset level. This secondary current shunt is demonstrated by zener diode ZD1 68 and resistors R1 58 and R2 60 electrically attached to the LED hold circuitry. The LED circuit receives an additive linear amount of current up to its maximum current level before the secondary shunt is activated. This allows the LED 64 to illuminate as brightly as possible, without damaging the LED 64. As previously mentioned, the nature of this circuit is such that it can be optimized for specific applications or operating environments by varying the circuit component values. Specific values for the circuit components of one embodiment are provided in Table 2 below:

TABLE 2

FIG. 3 Components

| Reference Number | Component Designation | Value |
|---|---|---|
| 58 | *R1 | 10Ω |
| 60 | *R2 | 50Ω |
| 66 | R3 | 160Ω |
| 50 | R4 | 40.2kΩ |
| 52 | R5 | 18.7kΩ |
| 68 | *ZD1 | 3 V |
| 48 | ZD2 | 15 V |
| 56 | C1 | 3.3 μF |

*Indicates the suggested use of high power components

The embodiment provided in Table 2 should not be construed as being indicative of the entire scope of the invention, rather as one embodiment optimized for one operating environment according to component selection principles understood by those skilled in the art.

Figure 4:
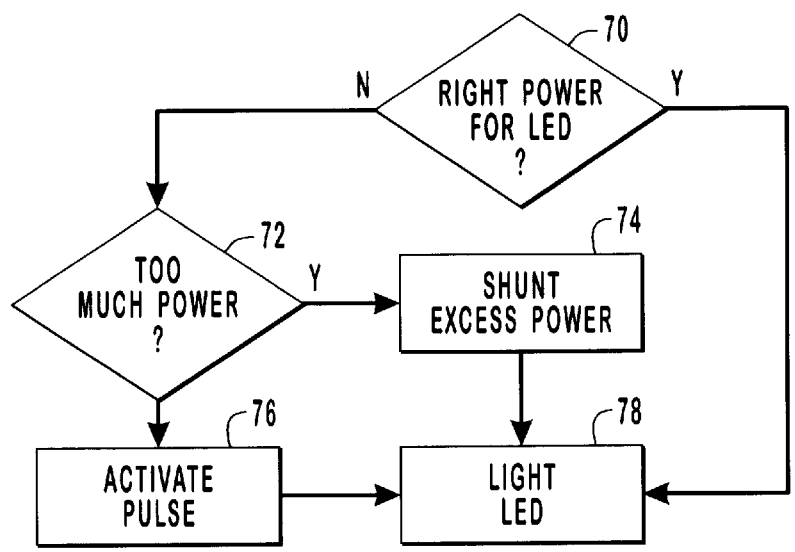
FIG. 4 is a block diagram for lighting a line status indicator using line side power.

FIG. 4 depicts a block diagram demonstrating a method of using the line side current to indicate off-hook status without damaging the LED indicator. Decision block 70 determines whether the line side current is within the tolerance levels for the LED. As previously mentioned, if the minimum line side current value is 10 mA, a designer could feasibly focus on a range of 10 mA to 20 mA as an acceptable range, the preferred range being somewhere in the middle around 15 mA. If the current is at this level, then execution block 78 will light the LED using the available power. If the power is not within the prescribed range, decision block 72 determines whether there is excess power in the circuit. If there is too much power, execution block 74 activates the shunt switch and the excess power is dissipated leaving the preferred or desired power amount to light up the LED in Execution block 78. If there is not enough power to activate the LED, then execution block 76 activates a pulse protocol. This protocol allows power to build up in a pulse module until the stored power reaches a specified level. The pulse module can be implemented by a LM3909 in conjunction with an indicator and a capacitor. There are also several pulse module devices which combine the capacitor, indicator, and flasher/oscillator into one device. Once the specified power level has been reached, the pulse module switches the stored power to execution block 78 and the LED is illuminated for a period of time relative to the power sent.

Figure 5:
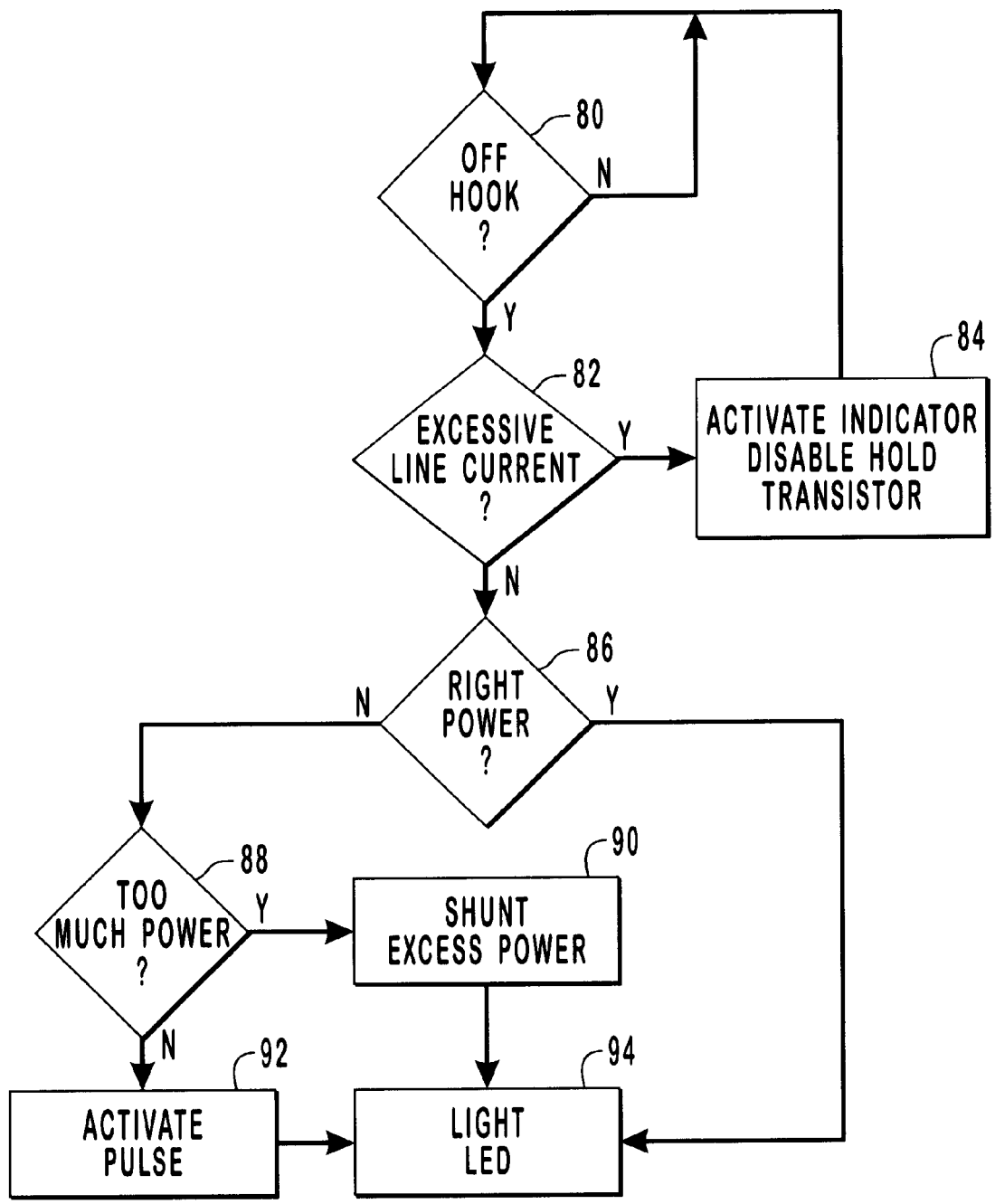
FIG. 5 is a block diagram illustrating a digital line indicator and an off-hook status indicator.

As previously mentioned, one of the most dangerous activities for a mobile digital device user is plugging their analog modem into a digital line. In many cases, this will burn out the modem circuit or at least burn out the connectors. In utilizing the present invention, it is possible to attach the shunt circuit to the line detectors to detect and warn a user that the line they are attached to is a digital line. FIG. 5 illustrates a flow chart indicating the line status for a line attached to the terminal interface device and warns the user about the presence of a digital line. Decision block 80 determines if the terminal interface device is off-hook. If the modem has not been instructed to go off-hook or a ring is not detected then the system returns to the initial decision block 80 until this test is satisfied. Once the line is off-hook, decision block 82 is used to determine whether the modem is attached to a digital line. One method of determining whether the line is digital is by checking the line for the presence of excessive line current. If the line is digital, execution block 84 activates an indicator light, shunts the excess power, and the terminal interface device is commanded to shut off the hold transistor. Additional circuitry could be added to the hold circuit that will send an indication of the excessive line condition back to the host computer. The host computer would then place the terminal device back on-hook. If decision block 82 determines that no digital line is present, then the system proceeds to decision block 86 to determine whether the appropriate power is being supplied to indicate the off-hook status. If the power is at this level, then execution block 94 will activate the off-hook line indicator using the available power. If the power is not within the prescribed range, decision block 88 determines whether there is excess power in the circuit. If there is too much power, execution block 90 activates the dissipation module to dissipate the excess power, leaving the preferred or desired power amount to light up the LED in Execution block 94. If there is not enough power to activate the indicator, then execution block 92 activates a pulse module to store power until the stored power reaches a specified level. Once the specified level has been reached, the pulse module sends the stored power to execution block 94 and the indicator is turned on for a period of time proportional to quantity of power sent by the pulse module.

Figure 6:
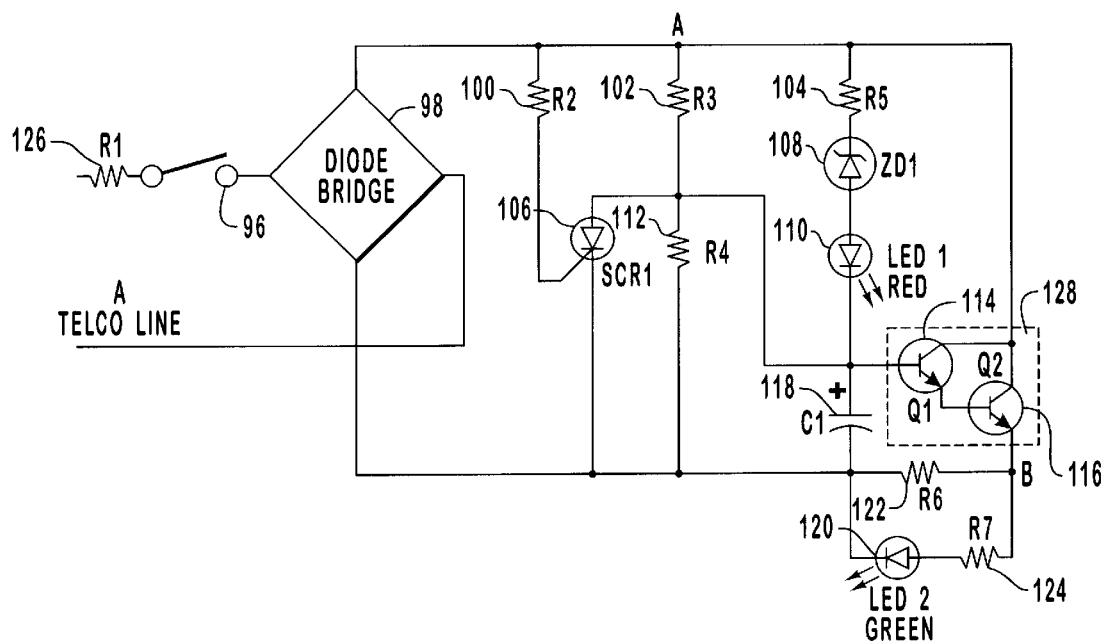
FIG. 6 is a circuit diagram illustrating a dual indicator using line side power.

FIG. 6 depicts a combination line powered indicator circuit with dual LED indicators for excessive current and off-hook conditions. This circuit indicates both the off-hook status and the presence of an excessive line current condition to a user through controlled illumination of two different colored LEDs. The addition of the second warning indicator for excessive line current is useful in protecting the user's analog modem from damage due to an improper connection to a digital line. This circuit uses line side power to indicate the presence of dangerous excessive line current, typically present when connected to a digital line. Alternative embodiments to the circuit in FIG. 6 provide the user with a variety of indicators of an incorrect line current. For example, excessive line current can be indicated through an indicator state, illumination brightness, or a color change (e.g., from green to red). Just as previously discussed with the off-hook indicators, various types of indicators may be used to indicate excessive line current, including illumination, in which a specific color or brightness is used; sound, in which a continual beeping or audio warning signal is generated; tactile response, in which a modem may vibrate violently or may provide a spark or vibration and; any combination of these senses used to indicate excessive line current.

Specifically, FIG. 6 provides a representative circuit for indicating off-hook line status and the presence of excessive line current. A silicon controlled rectifier (SCR) 106 is used to redirect the flow of current in a modem's "hold circuit." A normal simplified hold circuit is generally made up of off-hook switch 96, diode bridge 98, resistors R3 102, R4 112, and R6 122, capacitor 118, and transistor 128 constructed from transistors Q1 114 and Q2 116 arranged in the previously discussed Darlington configuration. When viewed at common potential node A, the telephone company's line connection point, these elements look like a constant DC current sink to the line. Resistor R1 126 is shown in this hold circuit to simulate telephone line loop length resistance. In this preferred embodiment, indicator components have been added to the basic hold circuit to indicate off-hook status and excessive line current using line side power. This circuit embodiment uses LED illumination to indicate off-hook or excessive line current conditions.

The excessive line current circuitry is formed from resistors R2 100, R5 104, SCR 106, zener diode ZD1 108, and red LED1 110. Under normal modem operation, these components are never seen by the telephone line. They look like a high AC and DC impedance to the line due to ZD1 108. They are only activated when the line current exceeds a preset level. Such a condition could exist when the modem is connected to a digital communications line. The switching threshold level is controlled by the current in R2 100 and the forward bias voltage level of the SCR anode 106 set by R3 102 and R4 112. Under normal conditions, the current through R2 100 is very small and would be ignored by the telecommunications line. The high value of R2 100 limits the forward bias current. When an excessive line current condition exists, the current through R2 100 exceeds the gate trip level of SCR 106. When the SCR gate is tripped, the SCR 106 is turned on and remains in a low impedance state until the hold current through the anode drops below the SCR minimum latch current value. This allows the loop current to flow through the SCR 106. The SCR 106 sinks the current that is sourced through R3 102 and through LED1 110. The majority of the current, going through the SCR 106, is sourced by LED1 110, which appears like a lower impedance to SCR 106 than R3 102 does. As the current is passed through LED1 110, it lights up and may illuminate an external visual indicator. Some current will continue to flow through R3 102 to SCR 106, but this amount of current is small compared to what is going through LED1 110. The current through LED1 110 is limited by R5 104 and the voltage drop across the ZD1 108. ZD1 108 also functions to keep the excessive current indicator loop out of the hold circuit until current reaches a predetermined point. Another advantage of ZD1 108 is that it keeps the circuit linear, essentially functioning as a threshold switch for LED1 110. These two elements prevent the destruction of LED1 110 by blocking overly excessive current or voltage through and across LED1 110. When the SCR 106 is activated, the base of Q1 114 is pulled virtually to ground and the transistors are turned off. The stoppage of current through the transistors protects them from overheating. To prevent damage the $V_{CE}$ of the transistors must not be violated. This means that LED1 110, ZD1 108, and R5 104 must be rated sufficiently high in power and current to enable them to pass virtually the entire loop current. As a result, this circuit will now use the applied line side over-current to illuminate or to make the indication whenever an over-voltage or over-current condition exists.

The second component of the dual indicator circuit depicted in FIG. 6 is created by LED2 120, part of a representative circuit for an off-hook indicator. This indicator is placed in parallel to the normal DC loop path of the hold circuit. Hold current is split between R6 122 and R7 124 at point B. LED2 120 draws power from the loop current normally generated in the hold circuit from the available line side power. LED2 120 indicates that the terminal interface device is in a off-hook condition without using power from the host's computer. The off-hook indication functionality is added and controlled, in a similar manner to the pure off-hook circuits previously presented, by resistor R7 124 and a colored LED2 120, in this case a green LED. R7 124 limits current passed through LED2 120. The combination circuit functions in similar fashion to the previously described circuits, until excessive line current is detected. Specific values for the circuit components of one combination embodiment are provided in Table 3 below:

TABLE 3

FIG. 6 Components

| Reference Number | Component Designation | Value |
|---|---|---|
| 126 | R1 | 200Ω |
| 100 | R2 | 7.9kΩ |
| 102 | R3 | 40.2kΩ |
| 112 | R4 | 18.7kΩ |
| 104 | R5 | 1kΩ |
| 122 | R6 | 10Ω |
| 124 | R7 | 100Ω |
| 118 | C1 | 3.3 μF |
| 108 | ZD1 | 8 V |

The component values provided in Table 3 are exemplary of one embodiment and may be changed or optimized for an alternative operating environment according to component selection principles understood by those skilled in the art without departing from the scope of the present invention.

With the combination of off-hook and over-current circuits being used in tandem in the basic hold circuit, FIG. 6 provides the preferred embodiment for a multiple function indicator module powered by line side current. By using multiple colored LEDs, the circuit can quickly provide line status information immediately to the user. By combining the two circuit paths at point B, in the hold circuit, the specified power drain is shared between three components R7 124, R6 122, and LED2 120. In an excessive over-voltage situation the transistors 128 are shut off reducing the heat dissipated in the circuit. While FIG. 6 provides specific resistors, alternative circuits can be developed that would be programmable for various standards. Using various current and voltage regulators, the indicator modules can be shunted from the dissipation circuits and the excessive line current levels can be changed to correspond with the telephone network standards. Other variations that are presently envisioned for multi-function circuits similar to the circuit depicted in FIG. 6 include the use of an opto-isolator used in series or parallel to the LED indicators to send a trigger signal to the terminal interface device and thereby indicate the fault condition. Another embodiment includes adding additional indicators that are under the modem's control to the circuit. The modem controlled LED could illuminate or be flashed by the computer, the microprocessor, or the microcontroller to demonstrate data transfers or other warning signals. The modem controlled LED could indicate numerous other conditions such as line busy, data transmission, length of data transmission, etc. The use of a different colored LED would help the user to see the line status in one glance. For example, if both LEDs were the same color, only the brightness could differentiate the status. Brightness is a very subjective indicator and is therefore not always good visual indicator. However, a color change of indicators in the terminal interface device indicator module is easy to observe.

FIG. 7 introduces the use of a Flasher/Oscillator module to vary the manner of visual indicator used in the circuit. Specifically, the diagram illustrates a hold circuit utilizing a blinking off-hook indicator and a solid excessive line current indicator. The primary differences between the standard hold circuit and the circuit depicted in FIG. 7 are the additions made to the "emitter resistor" of the Darlington transistor circuit Q1 54 and the parallel excessive line current circuitry. Normally, only a single resistor, R6 58, is connected to the emitter junction of the Darlington transistor circuit Q1 54, but in this circuit the resistor, R6 58, has been adjusted and indicator circuitry has been added comprising the current shunt loop 128 and the indicator circuitry 148. The current shunt loop 128 comprising resister R7 and zener diode ZD2. The blinking indicator circuitry 148 comprising a flasher/oscillator 130, an indicator LED2 132, and a capacitor C2 134. The blinking indicator circuitry 148 may use a LM3909 as the flasher/oscillator 130 to power indicator LED2 132 and capacitor C2 134. DC current is passed through transistor circuit Q1 54 towards the indicator LED2 132. The current shunt loop 128 protects the blinking indicator circuitry 148 by shunting line current in excess of the desired quantity away from the blinking indicator circuitry 148. The voltage across current shunt loop 128 powers the blinking indicator circuit 148. While the capacitor C2 134 charges, the indicator LED2 132 is turned off. Once the capacitor is fully charged the flasher/oscillator 130, begins to discharge the capacitor C2 134. As capacitor C2 134 discharges, current will flow through the indicator LED2 132 and as a result, the indicator LED2 132 is turned on while capacitor C2 134 discharges. The size of the capacitor C2 134, loop length, and the potential quantity of current flow through the circuitry determines the length and frequency of the indicator flashes. In higher line voltage or current situations indicator LED2 132 will flash faster as the capacitor C2 134 charges faster, this is one method of determining the loop length of the telephone connection. The shorter the loop length, the higher the loop current and generally the better the connection, and the faster the indicator LED2 132 flashes. In general, loop length refers to the distance between the device initiating the call and the communication hub, thus a loop length resistance will increase the farther the device is from the communication hub. One embodiment of the present invention utilizes the varying resistance based on loop length to vary the pulse rate of the line status indicator, specifically the shorter the loop length the higher the loop current the better the connection and the stronger the line signal thereby causing the indicator to pulse faster.

The excessive line current circuitry is formed from resistors R2 138, R1 140, and R5 142; SCR 136; zener diode ZD1 144; and indicator LED1 146. Under normal modem operation, these components are never seen by the telephone line. They look like a high AC and DC impedance to the line due to zener diode ZD1 144. They are only activated when the line current exceeds a preset level. Such a condition could exist when the modem is connected to a digital communications line. The switching threshold level is controlled by the current in resistor R1 140 and the forward bias voltage level of the SCR anode 136 set by resistors R3 50 and R4 52. Under normal conditions, the current through resistors R2 138 and R1 140 is very small and would be ignored by the telecommunications line. The high value of resistors R2 138 and R1 140 limits the forward bias current. When an excessive line current condition exists, the current through resistor R1 140 exceeds the gate trip level of SCR 136. When the SCR gate is tripped, the SCR 136 is turned on and remains in a low impedance state until the hold current through the anode drops below the SCR minimum latch current value. This allows the loop current to flow through the SCR 136. The SCR 136 sinks the current that is sourced through resistor R3 50 and through indicator LED1 146. The majority of the current, going through the SCR 136, is sourced by indicator LED1 146, which appears like a lower impedance to SCR 136 than resistor R3 50 does. As the current is passed through indicator LED1 146, it lights up and may illuminate an external visual indicator. Some current will continue to flow through resistors R2 138 and R1 140 in parallel with SCR 136, but this current is small compared to what is going through indicator LED1 146. The current through indicator LED1 146 is limited by resistor R5 142 and the zener diode ZD1 144. These two elements prevent the destruction of indicator LED1 146 by blocking overly excessive current or voltage through and across indicator LED1 146. When the SCR 136 is activated, the base of transistor Q1 54 is pulled virtually to ground and the transistors are turned off. The stoppage of current through the transistors protects them from overheating. To prevent damage the $V_{CE}$ of Q1 54 must also not be violated. This means that indicator LED1 146, zener diode ZD1 144, and resistor R5 142 must be rated sufficiently high in power and current to enable them to pass virtually the entire loop current. As a result, this circuit will now use the applied line side over-current to illuminate or to make the indication whenever an over-voltage or over-current condition exists. Specific values for the circuit components of one combination embodiment are provided in Table 4 below:

TABLE 4

| Reference Number | FIG. 7 Components | |
|---|---|---|
| | Component Designation | Value |
| 130 | Flasher/Oscillator | LM3909 |
| 140 | R1 | 5kΩ |
| 138 | R2 | 85kΩ |
| 50 | R3 | 40.2kΩ |
| 52 | R4 | 18.7kΩ |
| 142 | R5 | 1kΩ |

TABLE 4-continued

| Reference Number | FIG. 7 Components | |
|---|---|---|
| | Component Designation | Value |
| 144 | ZD1 | 8 V |
| 58 | R6 | 1kΩ |
| 128 | R7 | 10Ω |
| 128 | ZD2 | 2.7 V |
| 56 | C1 | 3.3 μF |
| 134 | C2 | 100 μF |

The component values provided in Table 4 are exemplary of one embodiment and may be changed or optimized for an alternative operating environment according to component selection principles understood by those skilled in the art without departing from the scope of the present invention.

FIG. 8 portrays a hold circuit with a blinking excessive line current indicator and a solid off-hook indicator. The primary differences between the standard hold circuit and the circuit depicted in FIG. 8 are the addition, of an indicator to the "emitter resistor" of the Darlington transistor circuit Q1 54 and the additional parallel blinking excessive line current circuitry. Normally, only resistor R6 122 is connected to the emitter junction of the Darlington transistor circuit Q1 54, but in this circuit resistor R6 122 has been adjusted and an off-hook indicator LED2 166 has been added. The off-hook indicator LED2 166, is illuminated when the off-hook relay 46 is closed and the circuit activated by R3 50, R4 52, C1 56 and Q154, is sinking the appropriate current as dictated by resistors R6 122 and R7 166.

The blinking excessive line current circuitry is formed from resistors R2 158, R1 150, R5 152, SCR 156, zener diode ZD 154, and blinking indicator circuitry 168. The zener diode ZD 154 prevents the LM3909 from allowing the premature "firing" of the indicator LED1 162. The blinking indicator circuitry 168 pulses the current to an indicator LED1 162. The blinking indicator circuitry 168 comprising flasher/oscillator 160, indicator LED1 162, and capacitor C2 164. In this embodiment, the blinking indicator circuitry 168 preferably uses a LM3909 as the flasher/oscillator 160 to power indicator LED1 162 and capacitor C2 164. While the capacitor C2 164 charges, the indicator LED1 162, is turned off. Once the capacitor is fully charged, current will flow through the indicator LED1 162 and as a result the indicator is turned on while the capacitor C2 164 discharges. The size of the capacitor C2 164 and the potential quantity of current flow through the blinking indicator circuitry 168 determine the length and frequency of the indicator flashes.

Under normal modem operation, the blinking indicator circuitry 168 is never seen by the telephone line. The circuitry looks like a high AC and DC impedance to the line due to zener diode ZD 154 and SCR 156. The circuitry is are only activated when the line current exceeds a preset level. The switching threshold level is controlled by the current in resistors R1 150 and R2 158, and the forward bias voltage level of the SCR anode 156 set by resistors R3 50 and R4 52. Under normal conditions, the current through resistors R2 158 and R1 150 is very small and would be ignored by the telecommunications line. The high value of resistors R2 158 and R1 150 limits the forward bias current. The addition of resistor R2 158 makes the circuit more P independent with regards to the transistors of the SCR. When an excessive line current condition exists, the current through resistor R1 150 exceeds the gate trip level of SCR 156. When the SCR gate is tripped, the SCR 156 is turned on and remains in a low impedance state until the hold current through the anode drops below the SCR minimum latch current value. This allows the loop current to flow through the SCR 156. The SCR 156 sinks the current that is sourced through resistor R3 50 and through blinking indicator circuitry 168. As the current is passed through blinking indicator circuitry 168, it lights up and may illuminate an external visual indicator. Some current will continue to flow through resistors R2 158, R3 50, R4 52, and R1 150 from Tip 2 and Ring 4, but this current is small compared to what is going through the blinking indicator circuitry 168. The current through blinking indicator circuitry 168 is limited by resistor R5 152 and the zener diode ZD 154. These two elements prevent the destruction of blinking indicator circuitry 168 by blocking overly excessive current or voltage through and across blinking indicator circuitry 168. When the SCR 156 is activated, the base of transistor Q1 54 is pulled virtually to ground and the transistors are turned off. The stoppage of current through the transistors protects them from overheating, however; to prevent damage to the transistors, $V_{CE}$ for Q1 54 must also not be violated. As a result of this circuit contruction, this circuit uses the applied line side over-current to illuminate or to make the indication whenever an over-voltage or over-current condition exists. Specific values for the circuit components of one embodiment are provided in Table 5 below:

TABLE 5

FIG. 8 Components

| Reference Number | Component Designation | Value |
|---|---|---|
| 150 | R1 | 5kΩ |
| 158 | R2 | 85kΩ |
| 50 | R3 | 40.2kΩ |
| 52 | R4 | 18.7kΩ |
| 152 | R5 | 1kΩ |
| 122 | R6 | 10Ω |
| 124 | R7 | 100Ω |
| 56 | C1 | 3.3 μF |
| 164 | C2 | 100 μF |

The component values provided in Table 5 are exemplary of one embodiment and may be changed or optimized for an alternative operating environment according to component selection principles understood by those skilled in the art without departing from the scope of the present invention.

Although described for the purposes of clarity with regard to specific preferred embodiments, the present invention is not limited to those embodiments but rather is applicable broadly to all versions falling within the scope and spirit of the appended claims. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. For example, while specific elements are described in terms of their structural relationship to other component modules, there are numerous other functional modules that may be substituted into the line side circuitry without departing from the scope of the invention.

What is claimed and desired to be secured by United States Letters Patent is:

1. In a circuit switched communication network, a method for indicating a line side status using available line side current, comprising the steps of:
   a. when an off-hook state is present, sinking a minimum indicator portion of said line side current through an indicator means;
   b. said indicator means indicating line side status;
   c. when said line side current exceeds minimum indicator portion forming an excess current, sinking said excess current via an excess power dissipation circuit;
   d. when an excessive line current is present, sinking at least said minimum indicator portion of said line side current through an indicator means.

2. The method for indicating line side status using available line side current, as recited in claim 1, further comprising the steps of:
   a. when the presence of low line side current is detected, activating pulse circuitry to gradually reserve charge from available line side current to at least said minimum indicator portion;
   b. Once said pulse circuitry is charged to at least said minimum indicator portion, sinking at least said minimum indicator portion of said stored line side current.

3. The method for indicating line side status using available line side current, as recited in claim 1, wherein said indicator means further comprises an indicator for manifesting at least one of the following line side status conditions: the presence of excessive line current, off-hook condition, and the presence of low line side current.

4. The method for indicating line side status using available line side current, as recited in claim 3, wherein said indicator means also includes flash circuitry for indicating the relative length of a connection's loop length by pulsing faster when the line side status indicates a shorter loop length and stronger line current.

5. The method for indicating line side status using available line side current, as recited in claim 1, wherein said indicator means is at least one color coded light emitting diode (LED).

6. The method for indicating line side status using available line side current, as recited in claim 1, wherein said indicator means is an illuminated indicator panel incorporating at least one of the following: light pipes, light emitting diodes, and liquid crystal displays.

7. The method for indicating line side status using available line side current, as recited in claim 1, wherein said indicator means is a tactile indicator.

8. The method for indicating line side status using available line side current, as recited in claim 1, wherein said indicator means is an audio indicator.

9. The method for indicating line side status using available line side current, as recited in claim 1, further comprising the step of when a digital line is present, sinking said minimum indicator portion of line side current through said indicator means.

10. In a terminal interface device, an indicator circuit using line side power for determining and indicating line status, said indicator circuit comprising:
    a. a diode bridge for rectifying an incoming communication signal with an input connected to a communication network line;
    b. an off-hook switch for controlling the initial connection to the communication network, said off-hook switch being electrically connected to said diode bridge;
    c. a current regulator for regulating the line side current flow to avoid damaging circuit indicators with an input electrically connected to said off-hook switch;
    d. at least one indicator for displaying various line status qualities including a LED for displaying the off-hook status of the circuit, said LED being electrically connected to said current regulator;
    e. a power dissipation circuit electrically connected to at least one indicator and the off-hook switch for protecting the circuit in high voltage, high current situations and for dissipating excess line side power.

11. In a terminal interface device, a power management circuit using line side power available from a communication network, said terminal interface device for operatively coupling a terminal device with said communication network, said line side power being available to said power management circuit when said terminal device and said communication network interact, said power management circuit comprising:

a. a shunt regulator electrically coupled to a regulated output voltage to regulate said regulated output voltage by shunting to ground excess current;

b. a voltage regulator at least indirectly electrically coupled to said communication network to convert, when said voltage regulator is enabled, said line side power available from said communication network directly into regulated line side power which indirectly becomes said regulated output voltage; and c. a hold current sink electrically coupled between said regulated line side power of said voltage regulator and said regulated output voltage as controlled by said shunt regulator;

d. an indicator module for indicating line status electrically coupled to said regulated output voltage as controlled by said shunt regulator.

12. In a terminal interface device, the power management circuit as recited in claim 11, wherein said indicator module contains at least one of the following types of indicators:

a. visual indicators, comprising at least one of: illuminated light pipes, illuminated front panel indicators, colored indicators, pulsing indicators, light emitting diodes, liquid crystal displays, and other low power display devices;

b. audio indicators, comprising at least one of: low powered clicking from switches, constant pitch warnings, musical or verbal combinations, variable frequency and tone ringing, audible speaker oscillations, and other audio reverberations;

c. tactile indicators, comprising at least one of: vibrations, contour adjustments, temperature adjustments, and other low level electric stimulations.

13. In a terminal interface device, the power management circuit as recited in claim 11, wherein said indicator module senses the presence of excessive line current and activates an excessive line current indicator.

14. In a terminal interface device, the power management circuit as recited in claim 13, further comprising hold transistors at least indirectly electrically coupled to said communication network and controlled in part by said terminal device, said hold transistors being disabled when the indicator module activates the excessive line current indicator, said excessive line current indicator signaling said terminal device to place an off-hook switch back on-hook.

15. In a terminal interface device, the power management circuit as recited in claim 11, wherein said terminal interface device is a modem for interfacing between said terminal device and said communication network, wherein said modem is compatible for interfacing with said communication network including a public switched telephone network and said terminal device including a computer.

16. In a terminal interface device, the power management circuit as recited in claim 11, wherein the shunt regulator is activated upon the release of a hold current to a level that satisfies a minimum SCR activation current, thereby activating a SCR switch.

17. In a terminal interface device, the power management circuit as recited in claim 11, wherein said indicator module further comprises at least one of the following indicators:

a. an off-hook indicator denoting a off-hook status of the terminal interface device;

b. an excessive line current indicator warning of the presence of excessive line side current; and c. a low line current indicator designating low line side current across the terminal interface device.

18. In a terminal interface device, the power management circuit as recited in claim 17, wherein said indicator module further comprises at least one flashing indicator, said at least one flashing indicator pulsing at a frequency proportionately related to a line status parameter.

19. In a terminal interface device, the power management circuit as recited in claim 11, wherein said hold current sink further comprises:

a. a sense portion directly electrically coupled to said regulated line side power of said voltage regulator to control said hold current shunt regulator to sink excess regulated line side power, said sense portion controlling said line side power drawn from said communication network signaling to said communication network an operational state of said data transfer portion; and b. a hold current shunt regulator electrically coupled and driven by said sense portion for sinking an amount of current as required by said communication network in order signal an operational state of said terminal interface device to said communication network.

20. In a terminal interface device, the power management circuit as recited in claim 11, wherein said hold current sink further comprises:

a. a programmable input to control said hold current shunt regulator to variably sink excess regulated line side power thereby variably signaling to said communication network an operational state of said data transfer portion according to variable global standards of said communication network for a specified hold current comprised of said excess regulated line side power and said operational power.

* * * * *

UNITED STATES PATENT AND TRADEMARK OFFICE
CERTIFICATE OF CORRECTION

PATENT NO. : 6,724,889 B1
DATED : April 20, 2004
INVENTOR(S) : Giles et al.

It is certified that error appears in the above-identified patent and that said Letters Patent is hereby corrected as shown below:

Column 1,
Line 62, change "Often existing" to -- Often, existing --.
Line 63, change "modem networks" to -- modern networks --.

Column 2,
Line 25, change "Once such standard" to -- One such standard --.

Column 3,
Line 9, change "power source," to -- power source; --.
Line 21, change "message, alas" to -- message. Alas --.
Line 22, change "error. Leaving" to -- error, leaving --.

Column 5,
Line 35, change "modem network" to -- modern network --.

Column 6,
Line 17, change "As describe" to -- As described --.

Column 7,
Line 21, after "FIG. 1" remove comma.
Line 22, before "Q1 14," change "transister" to -- transistor --.

Column 8,
Line 60, change "R 40" to -- R1 40 --.

Column 14,
Line 24, change "always good" to -- always a good --.
Line 40, change "resister R7" to -- resistor R7 --.

Column 15,
Line 1, change "farther" to -- further --.

Column 16,
Line 21, change "addition," to -- addition --.
Line 30, change "Q154" to -- Q1 54 --.
Line 53, after "The circuitry is" remove "are".
Line 62, before "independent" change "P" to -- β --.

Column 17,
Line 18, change "overheating, however;" to -- overheating. However, --.

UNITED STATES PATENT AND TRADEMARK OFFICE
CERTIFICATE OF CORRECTION

PATENT NO. : 6,724,889 B1
DATED : April 20, 2004
INVENTOR(S) : Giles et al.

It is certified that error appears in the above-identified patent and that said Letters Patent is hereby corrected as shown below:

Column 20,
Line 41, change "order signal" to -- order to signal --.

Signed and Sealed this

Twenty-fourth Day of January, 2006

JON W. DUDAS
*Director of the United States Patent and Trademark Office*